US007853769B2

(12) United States Patent
Okada et al.

(10) Patent No.: US 7,853,769 B2
(45) Date of Patent: Dec. 14, 2010

(54) COMPUTER SYSTEM FOR MANAGING NUMBER OF WRITES FOR STORAGE MEDIUM AND CONTROL METHOD THEREFOR

(75) Inventors: Wataru Okada, Yokohama (JP); Yuri Hiraiwa, Sagamihara (JP); Masahide Sato, Noda (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 900 days.

(21) Appl. No.: 11/475,958

(22) Filed: Jun. 28, 2006

(65) Prior Publication Data

US 2007/0266215 A1 Nov. 15, 2007

(30) Foreign Application Priority Data

May 11, 2006 (JP) ............................ 2006-132597

(51) Int. Cl.
*G06F 13/00* (2006.01)
*G06F 12/16* (2006.01)

(52) U.S. Cl. ...................................... 711/165; 711/162

(58) Field of Classification Search ....................... None
See application file for complete search history.

(56) References Cited

U.S. PATENT DOCUMENTS 5,051,887 A 9/1991 Berger et al.
5,644,539 A 7/1997 Yamagami et al.
2003/0126391 A1* 7/2003 Neufeld et al. .............. 711/165
2004/0083335 A1 4/2004 Gonzalez et al.
2004/0162940 A1 8/2004 Yagisawa et al.

FOREIGN PATENT DOCUMENTS

EP 0544252 A2 6/1993
JP 2006-504201 2/2006

OTHER PUBLICATIONS

M. Blunden et al "IBM TotalStorage Enterprise Storage Server: Implementing ESS Copy Services with IBM eServer zSeries", Jul. 2004, pp. Cover-12, 86-91.

* cited by examiner

*Primary Examiner*—Denise Tran
(74) *Attorney, Agent, or Firm*—Brundidge & Stanger, P.C.

(57) ABSTRACT

Provided is a storage medium management system, in which when the same data as that stored in a first physical storage area is stored in a second physical storage area, a storage system connected to a host computer compares the number of remaining rewritable times for the first physical storage area and the number of remaining rewritable times for the second physical storage area with each other. When the number of remaining rewritable times for the first physical storage area is less than the number of remaining rewritable times for the second physical storage area, the storage system writes data written from the host computer to the second physical storage area and copies the data written in the second physical storage area to the first physical storage area.

7 Claims, 12 Drawing Sheets

DUPLICATION RESTART PROCESS
RECEIVE DUPLICATION RESTART INSTRUCTION 7010
COPY DIFFERENTIAL DATA 7020
OBTAIN TOTAL NUMBER OF WRITES AND MAXIMUM NUMBER OF WRITABLE TIMES FOR EACH STORAGE AREA 7030
COMPARE NUMBERS OF REMAINING REWRITABLE TIMES 7040
LARGER FOR PRIMARY STORAGE AREA
LARGER FOR SECONDARY STORAGE AREA
IS SWAPPING ALLOWED ? 7050
NO
YES
SWAP PHYSICAL VOLUMES CORRESPONDING TO PRIMARY AND SECONDARY LOGICAL VOLUMES 7060
END

LOGICAL-PHYSICAL MAPPING TABLE 1031

2001 2002 2003

| LOGICAL VOLID | PHYSICAL VOLID | CACHE RESIDENCE |
|---|---|---|
| LUN_1 | PDEV_1 | 0～1024 |
| LUN_2 | PDEV_2 | off |
| ... | ... | ... |

*FIG. 2*

PAIR DEFINITION TABLE 1032

| PAIR NAME (3001) | PRIMARY VOILID (3002) | PRIMARY DIFFERENTIAL BM (3003) | SECONDARY VOLID (3004) | SECONDARY DIFFERENTIAL BM (3005) | PRIMARY-SECONDARY SWAPPING ALLOWANCE (3006) |
|---|---|---|---|---|---|
| pair1 | LUN_1 | BM_1 | LUN_2 | BM_2 | true |
| pair2 | LUN_3 | BM_3 | LUN_4 | BM_4 | true |
| ... | ... | ... | ... | ... | ... |

*FIG. 3*

DIFFERENTIAL BITMAP 1033

| BLOCK ADDRESS | UPDATE |
|---|---|
| 0 | false |
| 1024 | true |
| 2048 | false |
| ... | ... |

TOTAL WRITE NUMBER MANAGEMENT TABLE 1034

| PHYSICAL VOLID | TOTAL WRITE NUMBER | MAXIMUM WRITABLE NUMBER |
|---|---|---|
| PDEV_1 | 10,000 | 500,000,000 |
| PDEV_2 | 100 | 500,000,000 |
| ... | ... | ... |

PATH MANAGEMENT TABLE 1163

10001 10002

| VIRTUAL PATH | REAL PATH |
| --- | --- |
| V_P1_T1_L1 | P1_T1_L1 |
| V_P2_T1_L1 | P2_T1_L1 |
| ... | ... |

FIG. 10

COMPUTER SYSTEM FOR MANAGING NUMBER OF WRITES FOR STORAGE MEDIUM AND CONTROL METHOD THEREFOR

CLAIM OF PRIORITY

The present application claims priority from Japanese application JP2006-132597 filed on May 11, 2006, the content of which is hereby incorporated by reference into this application.

BACKGROUND

This invention relates to a computer system, and more particularly, to a method of managing a storage medium in a computer system including the storage medium having a limited number of rewrites.

In general information systems, data is regularly backed up. Therefore, if data is lost by a storage system failure, data destruction by a computer virus, an erroneous operation by a user, or the like, the lost data can be recovered.

As one of backup techniques, a backup method using data duplication has been proposed (for example, see U.S. Pat. No. 5,051,887). According to this method, prior to the execution of backup, data used by an application (hereinafter, referred to as "original data") is duplicated (mirrored) in two storage areas. Then, by suspending the duplication, the backup is executed. As a result, the two storage areas are separated as independent areas. The data in one of the storage areas is handled as the original data, whereas the data in the other storage area is handled as a stored image of the original data at that point of time (hereinafter, referred to as "backup data"). In this manner, high-speed backup is made possible by suspending the duplication.

According to U.S. Pat. No. 5,051,887, under the suspension of the duplication of the original data after the backup data is obtained, data update for the original data is allowed. At the same time, the position of the updated data is recorded. The position of the updated data is a position of the storage area in which the data is written, for example, a block address of a block in which the data is written. To delete the backup data, the duplication of the data is restarted. At the same time, based on the record of the position of the updated data, the updated data is copied from the storage area for storing the original data to the storage area for storing the backup data. As a result, the duplication can be restarted at high speed.

The original data and the backup data described above may be stored in a hard disk drive. However, the original data and the backup data may also be stored in other types of non-volatile storage mediums. One of the other types of non-volatile storage mediums is, for example, a flash memory. The flash memory is data-rewritable. However, it is known that the characteristics of the flash memory are degraded by data rewrite. Therefore, when the flash memory is used as the storage medium, the execution of the number of writes exceeding a predetermined upper limit is not allowed to prevent the occurrence of a failure such as a data loss to ensure predetermined reliability and performance.

In order to prevent write processes from being concentrated in a partial area on the flash memory and to prevent only the partial area from being rapidly deteriorated, a technique of distributing targets of the write process has been disclosed (for example, see JP 2006-504201 A). According to JP 2006-504201 A, a storage area on the flash memory is divided into a plurality of storage areas. Then, data stored in a storage area for which a larger number of rewrites have been executed and data stored in a storage area for which a smaller number of writes have been executed are swapped. As a result, the number of writes are equalized.

SUMMARY

In general backup operation management, backup data is stored in a particular storage area to be retained only for a duration of retention set by an administrator. After the elapse of the duration of retention, new backup data is overwritten in the storage area. By repeating this operation, the backup operation of the original data is continued.

The application of the technique described in U.S. Pat. No. 5,051,887 to the operation management realizes the following process.

First, original data is duplicated. To be specific, when data is written from a host computer to a storage area for storing the original data which is one of the two storage areas used for duplication, the written data is copied to the other storage area for storing backup data. Hereinafter, the storage area from which the data is copied is referred to as a primary storage area, whereas the storage area to which the data is copied is referred to as a secondary storage area.

Thereafter, upon execution of backup, the duplication is suspended. To be specific, data copy from the primary storage area to the secondary storage area is suspended. Even if the data in the primary storage area is updated under suspension of the duplication, the update is not reflected on the secondary storage area. As a result, the data in the secondary storage area is obtained as backup data at the point of suspension of the duplication.

Thereafter, the duplication is suspended for a duration of retention set by an administrator. When the original data is updated during the retention, the position of update is recorded.

Thereafter, after elapse of the duration of retention, the duplication is restarted. At the restart of the duplication, the updated data is copied from the primary storage area to the secondary storage area based on the record of the updated position. As a result, the data in the primary storage area and that in the secondary storage area become identical with each other.

Thereafter, the duplication is suspended again to obtain new backup data.

In a case where the data at the same position is updated a plurality of times under suspension of the duplication and then the duplication is restarted, only the latest updated data is copied from the primary storage area to the secondary storage area. Therefore, a total number of writes for the secondary storage area is always equal to or less than that for the primary storage area. Then, with the elapse of operation time, a difference in total number of writes between the two storage areas becomes larger.

Even in a case where the duplication is maintained, when a plurality of data write requests for the same position in the primary storage area are successively issued, only the last written data of all the data is sometimes copied to the secondary storage area. Even in this case, the total number of writes for the secondary storage area is equal to or less than that for the primary storage area.

The increasing difference in number of writes between the primary storage area and the secondary storage area is generated even if the technique described in JP 2006-504201 A is used. This is because the primary storage area and the secondary storage area are designed to be provided not in the same flash memory but respectively in independent flash memories to prevent the original data and the backup data from being lost by a failure of a single flash memory simultaneously. Therefore, the technique described in JP 2006-504201 A can be merely used for equalizing the numbers of writes uniquely in the primary storage area and uniquely in the secondary storage area in a separate manner. As a result, an increasing difference in number of writes between the primary storage area and the secondary primary area is still generated.

In a case where a storage medium having a limited number of writes such as a flash memory is used as the storage area for storing data, the lifetime of the primary storage area is shorter than that of the secondary storage area. Alternatively, in a case where a storage medium whose I/O performance or the like deteriorates according to the total number of writes such as a flash memory is used as the storage area, the performance of the primary storage area is deteriorated earlier than that of the secondary storage area. Therefore, the storage medium for the primary storage area is required to be frequently replaced. As a result, maintenance cost for backup operation management increases.

According to a representative embodiment of this invention, there is provided a storage system coupled to a host computer through a network, characterized in that the storage system includes: a plurality of physical storage areas for storing data written by the host computer; and a controller for controlling writing and reading of data to and from the physical storage area, and in that: the plurality of physical storage areas include at least a first physical storage area and a second physical storage area; the controller compares a number of remaining rewritable times for the first physical storage area and a number of remaining rewritable times for the second physical storage area when the same data as data in the first physical storage area is stored in the second physical storage area; and when it is judged that the number of remaining rewritable times for the first physical storage area is less than the number of remaining rewritable times for the second physical storage area, the controller writes the data written by the host computer to the second physical storage area and copies the data written in the second physical storage area to the first physical storage area.

According to an embodiment of this invention, in a computer system in which backup is executed by using data duplication, a total number of writes for a storage area for storing operation data and that for a storage area for storing backup data are equalized. As a result, an interval between replacements of a storage medium is increased to reduce maintenance cost for backup operation management.

BRIEF DESCRIPTION OF THE DRAWINGS

FIG. 2 is an explanatory diagram of a logical-physical mapping table according to the first embodiment of this invention.

FIG. 3 is an explanatory diagram of a pair definition table according to the first embodiment of this invention.

FIG. 10 is an explanatory diagram of a path management table according to the second embodiment of this invention.

DETAILED DESCRIPTION OF THE PREFERRED EMBODIMENTS

Hereinafter, a computer system and a storage system according to embodiments of this invention, and a backup management method in the computer system and the storage system will be described with reference to the accompanying drawings. The following description does not intend to limit this invention.

(1) System Configuration According to a First Embodiment

Figure 1:
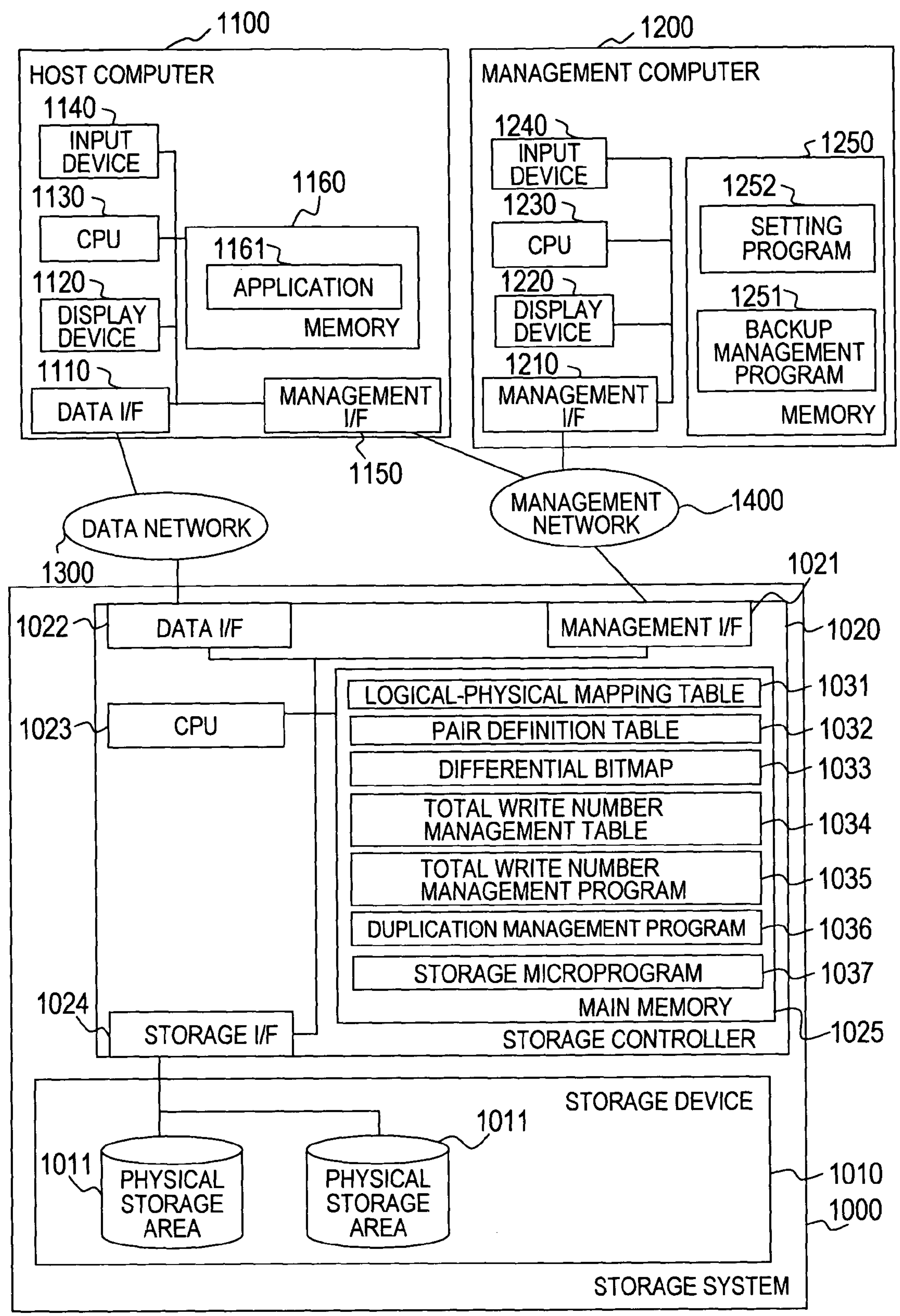
FIG. 1 is a block diagram showing a configuration of a computer system according to a first embodiment of this invention.

FIG. 1 is a block diagram showing a configuration of a computer system according to the first embodiment of this invention.

The computer system according to the first embodiment includes a storage system 1000, a host computer 1100, a management computer 1200, a data network 1300, and a management network 1400.

The storage system 1000 and the host computer 1100 are connected to each other through the data network 1300. In this embodiment, the data network 1300 is a storage area network (SAN). However, the data network 1300 may be an IP network or any other types of data communication networks.

The storage system 1000, the host computer 1100, and the management computer 1200 are connected to each other through the management network 1400. In this embodiment, the management network 1400 is an IP network. However, the management network 1400 may be a SAN or any other types of data communication networks. Alternatively, the data network 1300 and the management network 1400 may be the same network, and the host computer 1100 and the management computer 1200 may be the same computer.

For convenience of the description, FIG. 1 shows only one storage system 1000, one host computer 1100, and one management computer 1200. However, this invention is also applicable to a computer system including a larger number of the storage systems 1000, the host computers 1100, and the management computers 1200.

The storage system 1000 includes a storage device 1010 which stores data and a storage controller 1020 which controls the storage system 1000.

The storage device 1010 includes two or more physical storage areas 1011. Each of the physical storage areas 1011 is a physical storage area having a limited number of writes, such as a flash memory. The physical storage area 1011 may have a function of equalizing a total write number for each write position in each of the physical storage areas 1011. Alternatively, each of the physical storage areas 1011 may be a physical storage area including at least one storage medium and a control device having a function of equalizing a total write number for each write position between the storage mediums.

Hereinafter, this embodiment will be described taking a case where each of the physical storage areas 1011 is a flash memory as an example. However, each of the physical storage areas 1011 may be any storage device as long as the number of writes is limited. A flash memory or a phase-change optical disk device can be given as an example. However, this invention is also applicable to a magnetic disk device, an optical disk device, a magnetic tape device, a semiconductor memory device, or other types of storage devices, each of which has a limited number of writes. Examples of a configuration of the storage system when each of the physical storage areas 1011 is a flash memory will be described in detail below with reference to FIGS. 11A and 11B.

In the storage system 1000, the physical storage area 1011 is mapped to (associated with) a logical storage area. The host computer 1100 issues I/O instruction to the logical storage area. Various functions of the storage system 1000 such as remote copy are executed according to an attribute given to the logical storage area.

The storage controller 1020 includes a management interface (I/F) 1021, a data I/F 1022, a CPU 1023, a storage I/F 1024, and a main memory 1025.

The CPU 1023 is a processor which executes programs stored in the main memory 1025.

The main memory 1025 stores a logical-physical mapping table 1031, a pair definition table 1032, a differential bit map 1033, a total write number management table 1034, a total write number management program 1035, a duplication management program 1036, and a storage microprogram 1037.

The duplication management program 1036 is a program which controls backup using data duplication corresponding to the related art. To be specific, the duplication management program 1036 executes a process which synchronizes data stored in a primary storage area and data stored in a secondary storage area with each other to start the duplication, a process which suspends the duplication, and a process which copies an updated part of the original data to the secondary storage area to restart the duplication.

In this case, the primary storage area is the physical storage area 1011 corresponding to a copy source of the data or a logical storage area corresponding to the physical storage area 1011 (described below) when the data is duplicated. The primary storage area stores the original data. The secondary storage area is the physical storage area 1011 corresponding to a copy destination of the data or a logical storage area corresponding to the physical storage area 1011 when the data is duplicated. The data stored in the secondary storage area is handled as backup data of the original data.

To be specific, the host computer 1100 issues a data write request (Write instruction) to the primary logical storage area. The storage microprogram 1037 writes requested data to the physical storage area corresponding to the primary logical storage area corresponding to a request target according to the write request received from the host computer 1100. Furthermore, in a case where the duplication is not suspended, the storage microprogram 1037 copies the data written in the physical storage area corresponding to the primary logical storage area to the physical storage area corresponding to the secondary logical storage area.

In this embodiment, a new process is added to the process which restarts the duplication. The details of the new process will be described below shown in FIG. 7. Hereinafter, a pair of the primary storage area and the secondary storage area is simply referred to as a "pair". Moreover, the synchronization between the primary storage area and the secondary storage area to start or restart the duplication is referred to as "synchronization of the pair". To be specific, as a result of synchronization of the pair, the data stored in the secondary storage area becomes identical with that stored in the primary storage area. The suspension of the duplication for obtaining the backup data is referred to as "split of the pair".

The total write number management program 1035 is a program which manages the number of writes, to the physical storage area, (indirectly) generated by the write instruction issued from the host computer 1100 or a data copy instruction issued from the CPU 1023 which executes the duplication management program. The details of the process will be described below shown in FIG. 6.

The storage microprogram 1037 executes the input and output (write or read) of the data for the physical storage areas 1011 in response to a request from the host computer 1100. Furthermore, the storage microprogram 1037 executes the setting and the provision of control information in the storage system 1000 and the like in response to a request from the management computer 1200.

The details of each table will be described below with reference to FIGS. 2 to 5.

The data I/F 1022 is an interface connected to the data network 1300 and includes at least one communication port (not shown). The storage controller 1020 transmits and receives data and a control instruction to/from the host computer 1100 via the communication port.

The management I/F 1021 is an interface connected to the management network 1400. The storage controller 1020 transmits and receives data and a control instruction to/from the host computer 1100 and the management computer 1200 via the management I/F 1021.

The storage I/F 1025 is an interface connected to the storage device 1010, and transmits and receives data and a control instruction.

The host computer 1100 includes a data I/F 1110, a display device 1120, a CPU 1130, an input device 1140, a management I/F 1150, and a memory 1160.

The data I/F 1110 is an interface connected to the data network 1300, and includes at least one communication port (not shown). The host computer 1100 transmits and receives data and a control instruction to/from the storage system 1000 via the communication port.

The management I/F 1150 is an interface connected to the management network 1400. The host computer 1100 transmits and receives data and a control instruction to/from the management computer 1200 and the storage system 1000 via the management I/F 1150 for system management.

The display device 1120 is, for example, a screen display device such as a CRT.

The input device 1140 is, for example, a keyboard or a mouse.

The CPU 1130 is a processor which executes a program stored in the memory 1160.

The memory 1160 stores at least an application 1161.

The application 1161 is an application of a database management system (DBMS), a file system, or the like, which uses the physical storage area identified by a logical identifier.

For convenience of the description, FIG. 1 shows only one application 1161. However, a plurality of applications may be stored in the memory 1160.

The management computer 1200 includes a management I/F 1210, a display device 1220, a CPU 1230, an input device 1240, and a memory 1250.

The management I/F 1210 transmits and receives data and a control instruction to/from the host computer 1100 and the storage system 1000 for system management.

The display device 1220 is, for example, a screen display device such as a CRT.

The input device 1240 is, for example, a keyboard or a mouse.

The memory 1250 stores at least a backup management program 1251 and a setting program 1252.

The CPU 1230 executes various programs stored in the memory 1250 to realize each of the functions.

The setting program 1252 is a program for setting information in various tables stored in the main memory 1025. The setting program 1252 includes a process for communicating with the CPU 1023 which executes the storage microprogram 1037 to set the information. For establishment of the communication, an IP address of the management I/F 1021 is used. In this embodiment, the management computer 1200 has already obtained the IP address. Hereinafter, for communication with the CPU 1023, in a case where the CPU 1230 executes various programs, the communication is established as in the above-mentioned case. Therefore, the description for the establishment of communication is omitted in the following description.

The setting program 1252 provides a command line interface (CLI) or the like as an interface to allow a storage administrator or the other programs to execute the setting program 1252.

The backup program 1251 is a program for communicating with the CPU 1023 which executes the storage microprogram 1037 according to a backup schedule set by the storage administrator to instruct the synchronization or the split of the pair.

Figure 11A:
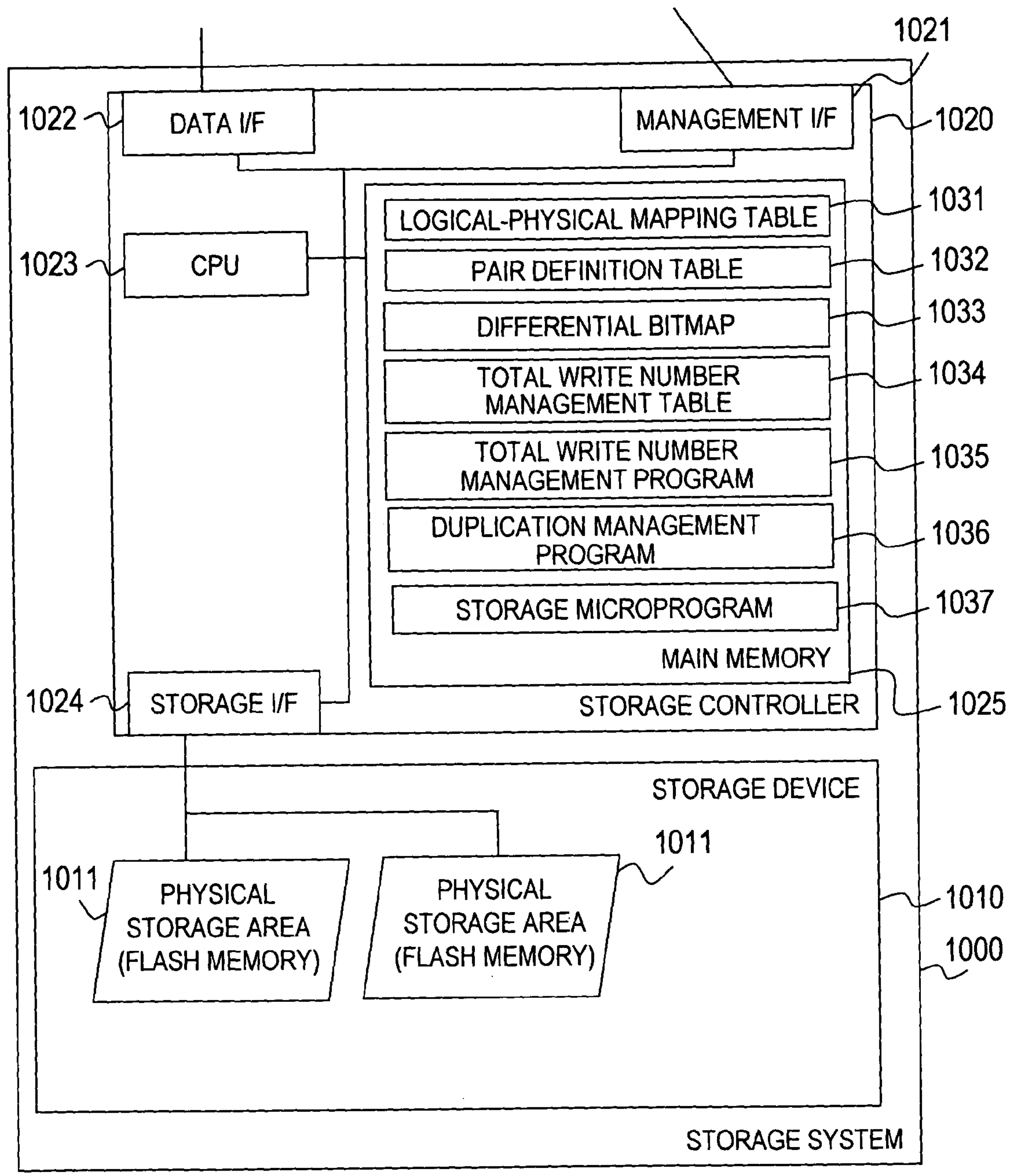
FIG. 11A is a block diagram showing a configuration of a storage system which includes one flash memory as one physical storage area according to the first embodiment of this invention.
Figure 11B:
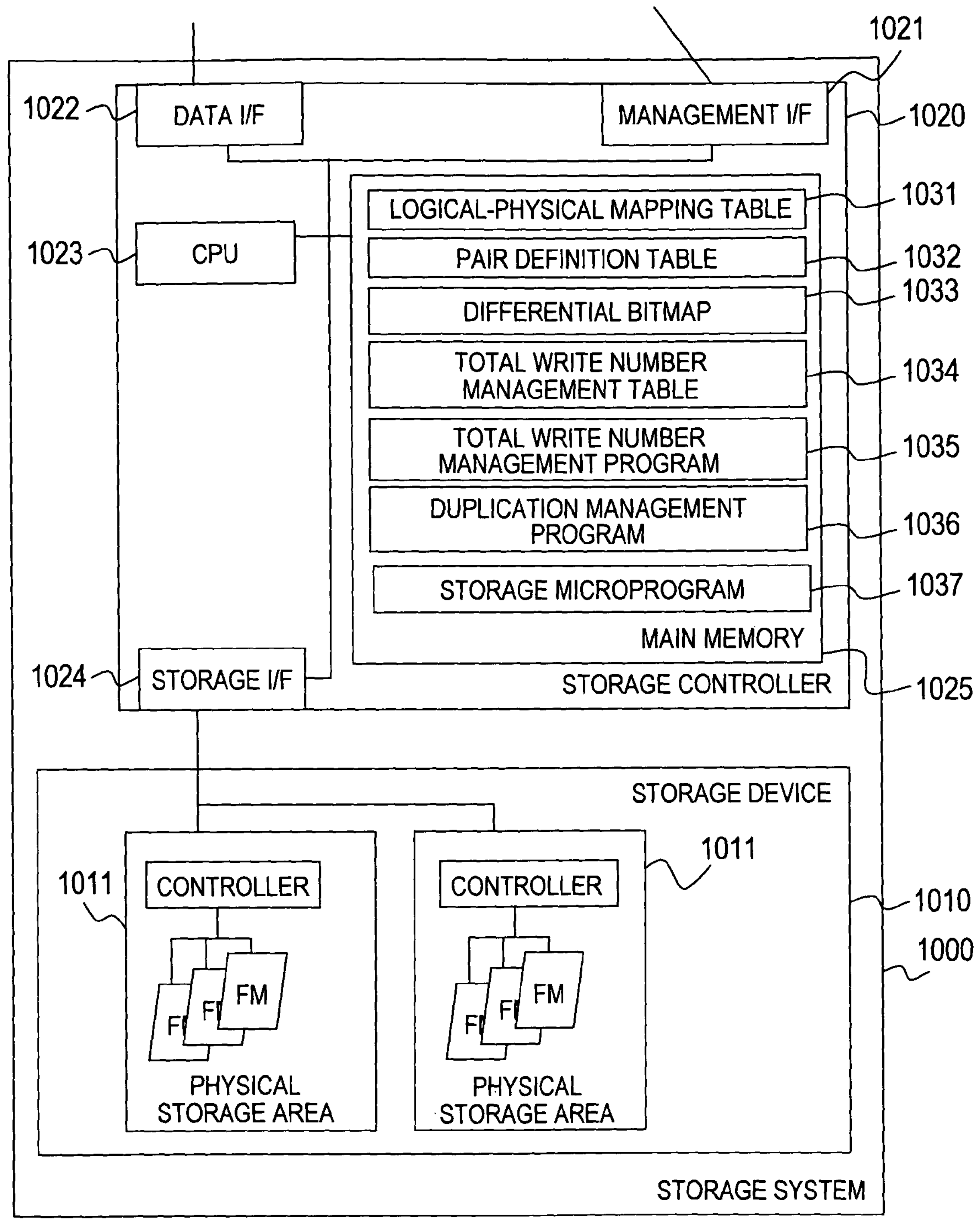
FIG. 11B is a block diagram showing a configuration of the storage system which includes at least one flash memory and a control device as one physical storage area according to the first embodiment of this invention.

FIGS. 11A and 11B are block diagrams, each showing a configuration of the storage system 1000 including flash memories as the physical storage areas 1011 according to the first embodiment of this invention.

In an example shown in FIG. 11A, one physical storage area 1011 is composed of one flash memory.

In an example shown in FIG. 11B, one physical storage area 1011 includes at least one flash memory (FM) and a controller having the function of equalizing the total write numbers for each write position between the flash memories.

FIGS. 2 to 5 show tables stored in the main memory 1025.

FIG. 2 is an explanatory diagram of the logical-physical mapping table 1031 according to the first embodiment.

In the logical-physical mapping table 1031, mapping information which associates the logical storage area and the physical storage area 1011 with each other is set. In a logical VOLID 2001, an identifier of a logical storage area is set. In a physical VOLID 2002, an identifier of the physical storage area 1011 corresponding to the logical storage area is set.

The setting program 1252 provides the CLI to set the above-mentioned two values. For example, by using the CLI, the administrator can issue a command such as "createVol -from PDEV_1". This command is an instruction which means "create a logical storage area from the physical storage area PDEV_1". The PDEV_1 is set in the physical VOLID 2002. In the logical VOLID 2001, an identifier that the CPU 1023 executing the storage microprogram 1037 can uniquely identify in the storage system is set.

For example, when a logical storage area LUN_1 corresponding to the physical storage area PDEV_1 is created as the result of execution of the above-mentioned command, "LUN_1" is set in the logical VOLID 2001 to correspond to the value "PDEV_1" of the physical VOLID 2002.

In the logical-physical mapping table 1031, information indicating an attribute given to the logical storage area may also be set. FIG. 2 shows a cache residence 2003 as an example of the attribute given to the logical storage area. In the cache residence 2003, for example, information indicating whether or not to make the data stored in the logical storage area to be resident in a cache memory (not shown) is set. When only the data stored in a part of the logical storage area is made to be resident in the cache memory (not shown), information specifying the part of the logical storage area is set in the cache residence 2003.

In the example shown in FIG. 2, as the cache residence 2003 corresponding to the value "LUN_1" of the logical VOLID 2001, "0 to 1024" is set. This value indicates that data stored at addresses 0 to 1024 in the logical storage area LUN_1 is made to be resident in the cache memory. On the other hand, as the cache residence 2003 corresponding to the value "LUN_2" of the logical VOLID 2001, "off" is set. This indicates that data stored in the logical storage area LUN_2 is not made to be resident in the cache memory.

The setting program 1252 provides the CLI to set the cache residence 2003. For example, by using the CLI, the administrator can issue a command such as "useCache -vol LUN_1 -from 0- to 1024". This command corresponds to an instruction which means "make data at addresses 0 to 1024 in the logical storage area LUN_1 to be resident in the cache memory". Accordingly, the value "0 to 1024" of the cache residence 2003 corresponding to the "LUN_1" in FIG. 2 is set.

FIG. 3 is an explanatory diagram of the pair definition table 1032 according to the first embodiment of this invention.

In the pair definition table 1032, management information for controlling the backup using the data duplication is set.

In a pair name 3001, an identifier of a pair is set.

In a primary VOLID 3002, an identifier of a logical storage area set as the primary storage area is set.

Figure 4:
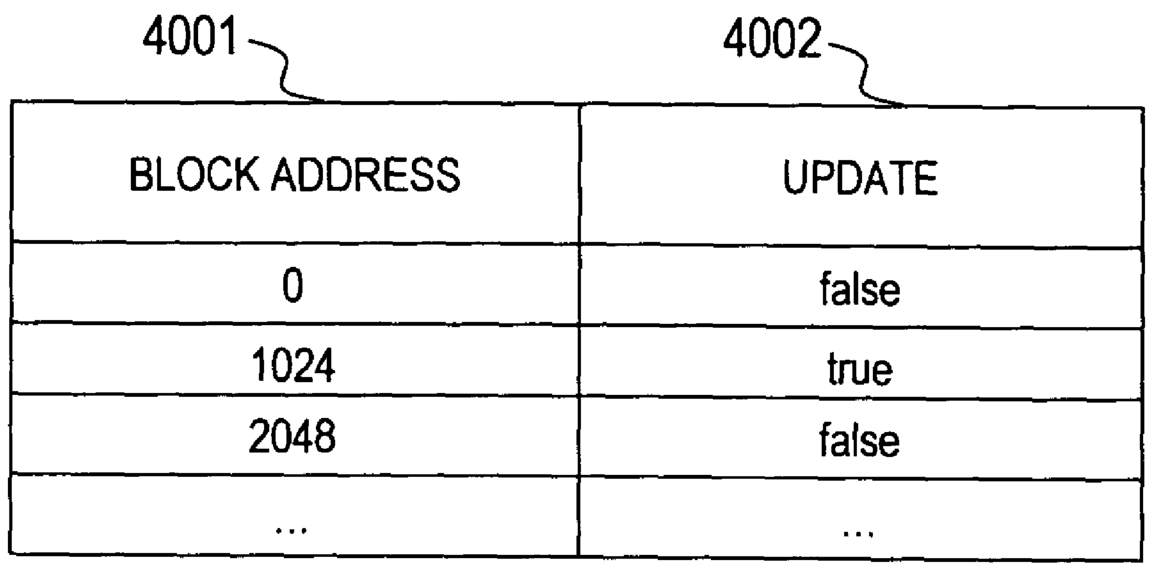
FIG. 4 is an explanatory diagram of a differential bit map according to the first embodiment of this invention.

In a primary differential BM 3003, information for identifying a primary differential bitmap is set. The primary differential bitmap shown in FIG. 4 is a bitmap for managing the position of write when the write occurs in the primary storage area under suspension of the duplication.

In a secondary VOLID 3004, an identifier of a logical storage area set as the secondary storage area is set.

In a secondary differential BM 3005, information for identifying a secondary differential bitmap is set. The secondary differential bitmap shown in FIG. 4 is a bitmap managing the position of write when the write occurs in the secondary storage area under suspension of the duplication.

In a primary-secondary swapping allowance 3006, information indicating whether or not to allow the physical storage areas to be swapped is set. The swapping of the physical storage areas is, for example, a process of newly associating the physical storage area 1011 currently associated with the primary storage area, with the secondary storage area, and newly associating the physical storage area 1011 currently associated with the secondary storage area, with the primary storage area, when the number of remaining rewritable times for the primary storage area is less than that for the secondary storage area. When the swapping is allowed, "true" is set in the primary-secondary swapping allowance 3006. When the swapping is not allowed, "false" is set in the primary-secondary swapping allowance 3006.

The setting program 1252 provides the CLI to set the above values. For example, by using the CLI, the storage administrator can issue a command such as "createPair -p LUN_1 -s LUN_2 -swap true pair1". This command is an instruction to "define a pair "pair1" with the logical storage area LUN_1 as the primary storage area and the logical storage area LUN_2 as the secondary storage area, and allow swapping according to the number of remaining rewritable times". As the result of execution of the instruction, values indicated in the first record in FIG. 3 are set in the pair definition table 1032. To be specific, "pair1" is set in the pair name 3001, "LUN_1" in the primary VOLID 3002, "LUN_2" in the secondary VOLID 3004, and "true" in the primary-secondary swapping allowance 3006.

Furthermore, for the pair definition, two differential bitmaps 1033 for the primary storage area and the secondary storage area are created. In an example of the first record in FIG. 3, an identifier "BM_1" of a differential bitmap for the primary storage area is set in the primary differential BM 3003, whereas an identifier "BM_2" of a differential bitmap for the secondary storage area is set in the secondary differential BM 3005.

FIG. 4 is an explanatory diagram of the differential bitmap 1033 according to the first embodiment of this invention.

The differential bitmap 1033 is information for managing the position at which write occurs when the write occurs in each of the logical storage areas in the state where the pair is split (in other words, under suspension of the duplication). In the differential bitmap 1033 according to this embodiment, the occurrence of write is managed for each block (one block=1024 bytes). However, the occurrence of write may be managed in the other units. In a block address 4001, an address of a block to be managed is set.

In an update 4002, information indicating the occurrence/non-occurrence of write is set. To be specific, when write occurs, "true" is set. When write does not occur, "false" is set.

Upon definition of a pair, the differential bitmap 1033 according to this embodiment is created to correspond to each of the primary storage area and the secondary storage area of the pair.

In the block address 4001, a head address of a block to be managed for the occurrence/non-occurrence of write is set in defining the pair.

A value of the update 4002 is referred to for the execution of synchronization of the pair. Accordingly, the data stored in the block having "true" as the value of the update 4002 is copied from the primary storage area to the secondary storage area. After the completion of the copy, "false" is set in the update 4002. When the write in the storage area occurs in the state where the pair is split, "true" is set as the value of the update 4002 corresponding to a write target block.

In the example shown in FIG. 4, at least "0", "1024", and "2048" are set as the block addresses 4001. Set as the updates 4002 corresponding to these values are "false", "true", and "false", respectively. The values in the update 4002 indicate that write does not occur in a 1024-byte block starting from the block address "0" and in a 1024-byte block starting from the block address "2048", whereas write occurs in a 1024-byte block starting from the block address "1024".

Figure 5:
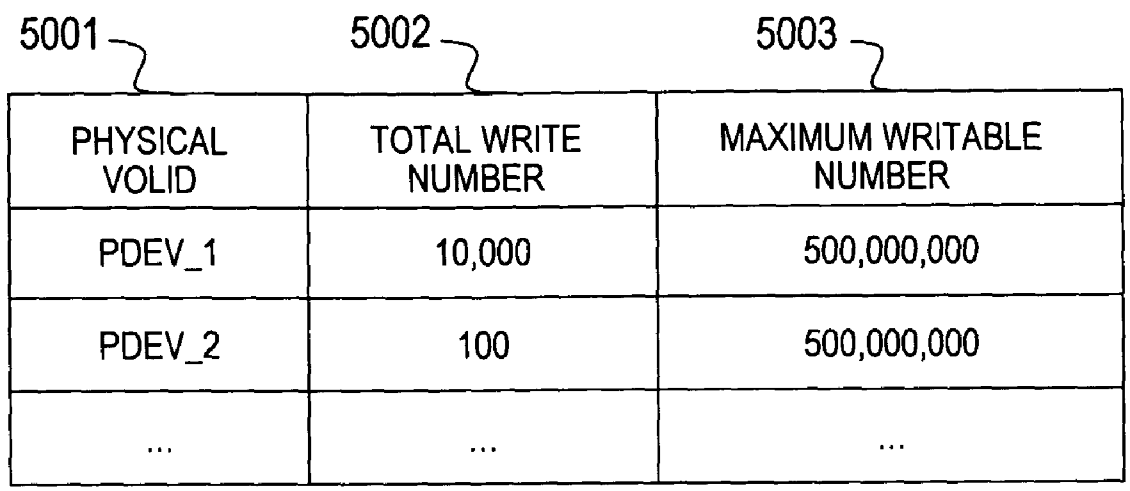
FIG. 5 is an explanatory diagram of a total write number management table according to the first embodiment of this invention.

FIG. 5 is an explanatory diagram of the total write number management table 1034 according to the first embodiment of this invention.

In the total write number management table 1034, information for managing a total number of writes executed for the physical storage area 1011 is set. In a physical VOLID 5001, an identifier of the physical storage area 1011 is set. In a total write number 5002, the number of writes which have already been executed for the physical storage area 1011 indicated in the physical VOLID 5001 is set. In a maximum writable number 5003, the maximum value of the number of write processes executable for the physical storage area 1011 indicated in the physical VOLID 5001 is set.

The physical VOLID 5001 is set by the assignment of an identifier for uniquely identifying the physical storage area 1011, which is executed by the CPU 1023 executing the storage microprogram 1037 upon installation of the physical storage area 1011.

In the maximum writable number 5003, information input by the system administrator or information provided by the physical storage area 1011 is set upon installation of the physical storage area 1011.

For example, the system administrator may execute the setting program 1252 of the management computer 1200 to input the maximum writable number 5003 to the storage controller 1020. The storage controller 1020 sets the input value in the maximum writable number 5003.

Upon installation of the physical storage area 1011, "0" is set in the total write number 5002. Then, each time write in the physical storage area 1011 occurs in response to a write instruction from the host computer 1100 or a data copy instruction from the CPU 1023 which executes the duplication management program 1036, the value in the total write number 5002 is incremented by the total write number management program 1035.

In this embodiment, the maximum writable number 5003 corresponds to the lifetime of the physical storage area 1011. In another embodiment of this invention, however, when the physical storage area 1011 whose performance deteriorates depending on the number of writes is used, a value indicating the largest number of writes with which performance deterioration is allowed (in other words, the maximum number of writes causing allowable performance deterioration) may be set in the maximum writable number 5003.

In this embodiment, the total write number management table 1034 is stored in the main memory 1025 within the storage controller 1020. However, the total write number management table 1034 may be retained in any part of the computer system. For example, the storage device 1010 or the management computer 1200 may retain the total write number management table 1034.

(2) Operation of the First Embodiment

Next, an operation of this first embodiment will be described.

Figure 6:
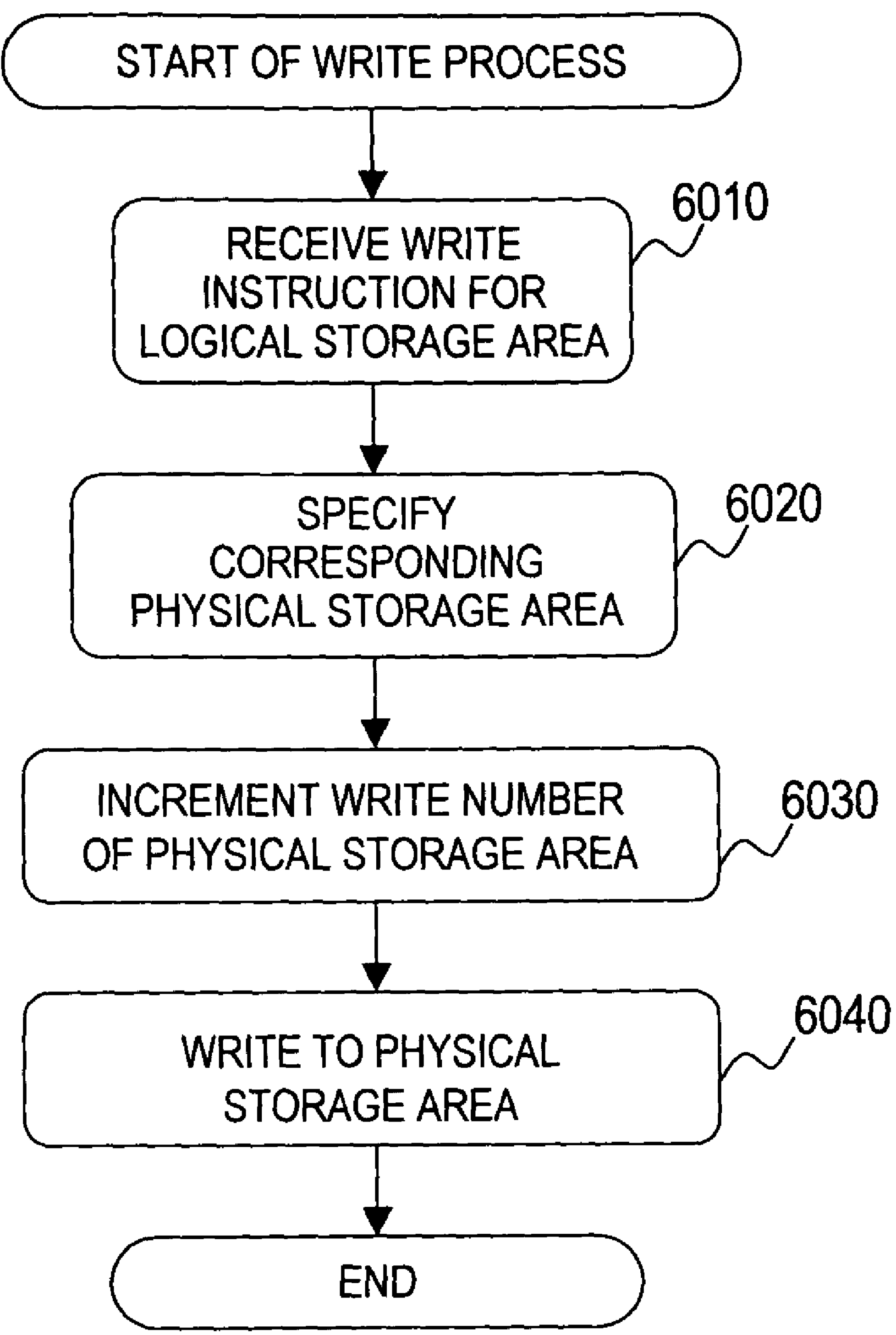
FIG. 6 is a flowchart of a write process executed by a CPU which executes a total write number management program according to the first embodiment of this invention.

FIG. 6 is a flowchart of a write process executed by the CPU 1023 which executes the total write number management program 1035 according to the first embodiment of this invention.

To be more specific, FIG. 6 shows a process executed by the CPU 1023 which executes the total write number management program 1035 when the CPU 1023 receives the write instruction. The write instruction may be issued by the host computer 1100 with respect to the logical storage area or may be generated by the data copy executed for the synchronization of a pair by the CPU 1023 executing the duplication management program 1036 with respect to the logical storage area.

First, the CPU 1023 receives the write instruction for the logical storage area (Step 6010). The write instruction contains an identifier of a write destination logical storage area and a write destination block address.

Next, the CPU 1023 refers to the logical-physical mapping table 1031 to obtain an identifier of the physical storage area 1011 corresponding to the logical storage area (Step 6020).

Next, the CPU 1023 refers to the total write number management table 1034 to increment the total write number 5002 of the physical storage area 1011 to which the identifier obtained in Step 6020 is assigned (Step 6030).

In the final step, the CPU 1023 writes data to the physical storage area 1011 to which the identifier obtained in Step 6020 is assigned (Step 6040). At this time, the write destination block address is the block address contained in the write instruction received in Step 6010.

The above described is the operation of the CPU 1023 which executes the total write number management program 1035 upon reception of the write instruction for the logical storage area.

Figure 7:
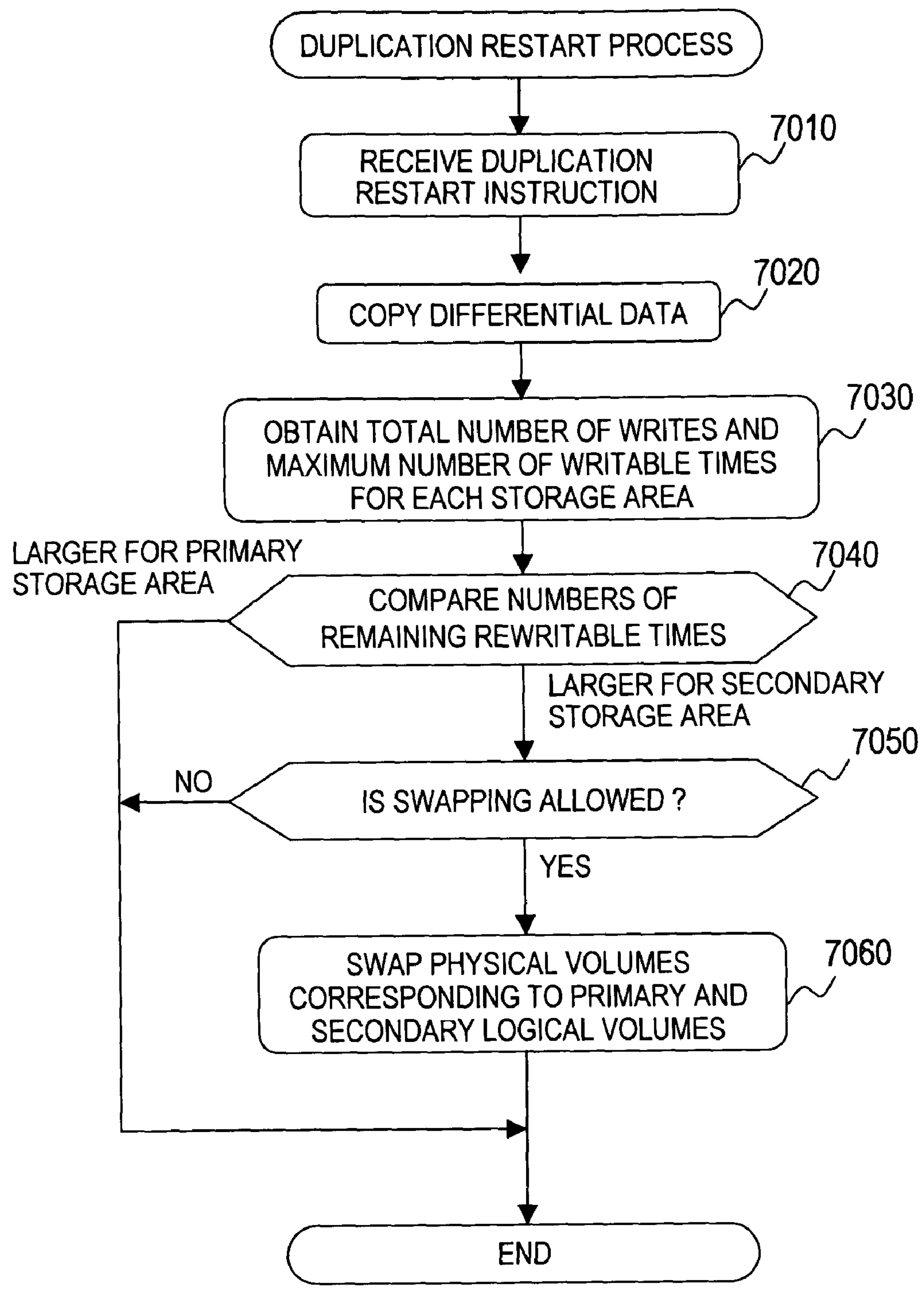
FIG. 7 is a flowchart of a duplication restart process executed by the CPU which executes a duplication management program according to the first embodiment of this invention.

FIG. 7 is a flowchart of a duplication restart process executed by the CPU 1023 which executes the duplication management program 1036 according to the first embodiment of this invention.

To be specific, FIG. 7 shows a process executed by the CPU 1023 which executes the duplication management program 1036 upon reception of an instruction of restarting the duplication from the backup management program 1251.

First, the CPU 1023 receives an instruction of restarting the duplication of the original data (Step 7010). The instruction contains a pair name to be synchronized.

Next, the CPU 1023 copies differential data (Step 7020). To be specific, the CPU 1023 refers to the pair definition table 1032 to specify the differential bitmap 1033 corresponding to the pair to be synchronized. At this time, two differential bitmaps respectively corresponding to the primary storage area and the secondary storage area are specified. When a block having "true" as the value of the update 4002 exists in any of the two differential bitmaps, the CPU 1023 copies data stored in the corresponding block from the primary storage area to the secondary storage area.

When the CPU 1023 judges that all the addresses in the differential bitmaps have been checked, the CPU 1023 recognizes that the data stored in the primary storage area and that stored in the secondary storage area are now identical with each other. Then, the CPU 1023 judges whether or not swapping of the primary storage area and the secondary storage area is required (see Steps 7030 and 7040).

To be specific, the CPU 1023 refers to the total write number management table 1034 to obtain the total write number 5002 and the maximum writable number 5003 corresponding to the physical VOLID 5001 of the physical storage area 1011 corresponding to each of the logical storage areas (Step 7030).

Next, the CPU 1023 calculates the number of remaining rewritable times for each of the physical storage areas 1011 from the obtained maximum writable number and total write number. To be specific, the number of remaining rewritable times is calculated by subtracting the total write number from the maximum writable number. Then, the CPU 1023 compares the number of remaining rewritable times for the physical storage area 1011 corresponding to the primary storage area and the number of remaining rewritable times for the physical storage area 1011 corresponding to the secondary storage area (Step 7040).

When it is judged in Step 7040 that the number of remaining rewritable times for the primary storage area is larger, it is desirable to continue using the storage area currently set as the primary storage area as the primary storage area to equalize the numbers of writes. Therefore, the CPU 1023 judges that the swapping of the primary storage area and the secondary storage area is not required, terminating the process without executing the swapping.

On the other hand, when it is judged in Step 7040 that the number of remaining rewritable times for the secondary storage area is larger, it is desirable to swap the primary storage area and the secondary storage area to equalize the numbers of writes. In this case, the CPU 1023 judges that the swapping of the primary storage area and the secondary storage area is required. Then, the CPU 1023 refers to the pair definition table 1032 to judge whether or not the swapping of the physical storage area mapped to the primary storage area and the physical storage area mapped to the secondary storage area is allowed (Step 7050).

When it is judged in Step 7050 that the swapping is not allowed, the CPU 1023 terminates the process.

On the other hand, when the swapping is allowed, the CPU 1023 refers to the logical-physical mapping table 1031 to swap the physical VOLID of the primary storage area and the physical VOLID of the secondary storage area (Step 7060). Then, the CPU 1023 terminates the process.

The above-mentioned duplication restart process may be executed at the time when the number of write processes executed after the execution of the previous swapping of the primary storage area and the secondary storage area reaches a predetermined number.

A specific example of the write process will now be described with reference to FIGS. 2 to 5. In the example shown in FIG. 3, in the pair "pair1", the logical storage area "LUN_1" is the primary storage area, whereas the logical storage area "LUN_2" is the secondary storage area. In the example shown in FIG. 2, the logical storage areas "LUN_1" and "LUN_2" correspond to the physical storage areas "PDEV_1" and "PDEV_2", respectively. In the example shown in FIG. 5, the number of remaining rewritable times for the physical storage area "PDEV_1" is 499990000 obtained by subtracting 10000 from 500000000. On the other hand, the number of remaining rewritable times for the physical storage area "PDEV_2" is 499999900 obtained by subtracting 100 from 500000000.

In this case, it is judged in Step 7040 shown in FIG. 7 that the number of remaining rewritable times for the secondary storage area is larger. As shown in FIG. 3, because the swapping of the primary storage area and the secondary storage area of the pair "pair1" is allowed, the physical VOLID of the primary storage area and the physical VOLID of the secondary storage area are swapped in Step 7060. To be specific, in the logical-physical mapping table 1031 shown in FIG. 2, the value of the physical VOLID 2002 corresponding to the value "LUN_1" of the logical VOLID 2001 is updated to "PDEV_2". On the other hand, the value of the physical VOLID 2002 corresponding to the value "LUN_2" of the logical VOLID 2001 is updated to "PDEV_1".

Accordingly, for example, when the host computer 1100 issues a request of writing data in the logical storage area "LUN_1", the storage microprogram 1037 writes the data to the physical storage area "PDEV_2". Furthermore, the storage microprogram 1037 copies the data written in the physical storage area "PDEV_2" to the physical storage area "PDEV_1" corresponding to the logical storage area "LUN_2". In this manner, the primary physical storage area 1011 and the secondary physical storage area 1011 are swapped to equalize the numbers of writes.

As illustrated in FIG. 2, the attribute such as the cache residence 2003 is assigned to the logical storage area. Therefore, as the result of swapping of the primary physical storage area 1011 and the secondary physical storage area 1011 in Step 7040, the attributes of the respective physical storage areas 1011 are also swapped.

For example, even if the physical storage area corresponding to the logical storage area "LUN_1" is changed from "PDEV_1" to "PDEV_2" as described above, the value of the cache residence 2003 which is the attribute corresponding to the logical storage area "LUN_1" still remains as "0 to 1024". Similarly, even if the physical storage area corresponding to the logical storage area "LUN_2" is changed from "PDEV_2" to "PDEV_1", the value of the cache residence 2003 which is the attribute corresponding to the logical storage area "LUN_2" still remains as "off". Accordingly, the value of the cache residence 2003 corresponding to the physical storage area "PDEV_1" is changed from "0 to 1024" to "off" and the value of the cache residence 2003 corresponding to the physical storage area "PDEV_2" is changed from "off" to "0 to 1024".

When it is judged in Step 7040 that the number of remaining rewritable times for the primary storage area is the same as that for the secondary storage area, the swapping of the primary physical storage area 1011 and the secondary physical storage area 1011 may be executed but is not required to be executed. In this embodiment, when the numbers of remaining rewritable times are the same for the primary physical storage area 1011 and the secondary physical storage area 1011, the swapping of the primary physical storage area 1011 and the secondary physical storage area 1011 is not executed.

In the above description for FIG. 7, the number of remaining rewritable times is calculated by subtracting the total write number from the maximum writable number to judge whether or not to execute the swapping of the physical storage areas 1011 (Step 7040). However, this invention can be implemented whichever method is used to calculate or estimate the number of remaining rewritable time.

For example, when the primary and secondary physical storage areas 1011 are composed of recording media of the same type, the maximum writable numbers 5003 for the primary and secondary physical storage areas 1011 are estimated to be the same. Therefore, the CPU 1023 may compare the total write number 5002 for the primary storage area and that for the secondary storage area with each other in Step 7040 to judge that the number of remaining rewritable times is larger for the physical storage area 1011 having a smaller total number of writes. In other words, the comparison between the total write number 5002 for the primary storage area and that for the secondary storage area in Step 7040 corresponds to the comparison between the number of remaining rewritable times for the primary storage area and that for the secondary storage area.

Alternatively, the number of remaining rewritable times may be calculated based on the number of erasures in place of the number of writes. Prior to the write of data in the flash memory, a process of erasing data already written in a write destination area of the data is executed. The lifetime of the flash memory depends on the number of erasure processes.

Therefore, for example, a total number of erasures may be set in place of the total write number 5002 and a maximum number of erasable times may be set in place of the maximum writable number 5003 in the total write number management table (FIG. 5). The total number of erasures corresponds to the number of actually executed erasure processes, whereas the maximum number of erasable times corresponds to the maximum value of the number of executable erasure processes. In this case, in Step 7040, it is judged that the physical storage area 1011 having a larger value obtained by subtracting the total number of erasures from the maximum number of erasable times has a larger number of remaining rewritable times. In other words, the comparison between the numbers of remaining erasable times in Step 7040 corresponds to the comparison between the number of remaining rewritable times for the primary storage area and that for the secondary storage area.

Alternatively, the judgment in Step 7040 may be executed depending only on the total number of erasures. When the primary and secondary physical storage areas 1011 are composed of recording media of the same type, the maximum number of erasable times is estimated to be the same for both the physical storage areas 1011. Therefore, the CPU 1023 may compare in Step 7040 the total number of erasures for the primary physical storage area 1011 and that for the secondary physical storage area 1011 with each other to judge that the number of remaining rewritable times is larger for the physical storage area 1011 having a smaller total number of erasures. In other words, the comparison in Step 7040 between the total number of erasures for the primary physical storage area and that for the secondary physical storage area with each other corresponds to the comparison between the number of remaining rewritable times for the primary physical storage area and that for the secondary physical storage area.

Further alternatively, the performance of the primary physical storage area 1011 and that of the secondary physical storage area 1011 may be compared with each other to execute the judgment in Step 7040 based on the result of comparison. The performance of the physical storage area 1011 is, for example, a write performance for writing data in the physical storage area 1011. The flash memory has a characteristic that the write performance becomes lower depending on the number of executed data erasures. Therefore, the CPU 1023 may monitor the write performance to compare in Step 7040 the write performance of the primary physical storage area 1011 and that of the secondary physical storage area 1011 with each other.

In this case, in Step 7040, it is judged that the number of remaining rewritable times is larger of the physical storage area 1011 having higher write performance. In other words, the comparison in Step 7040 between the performance of the primary physical storage area 1011 and that of the secondary physical storage area 1011 corresponds to the comparison between the number of remaining rewritable times of the primary physical storage area 1011 and that of the secondary physical storage area 1011. A target to be compared in Step 7040 may be any performance other than the write performance.

It is sometimes difficult to maintain the state where the data stored in two storage areas are synchronized with each other even while the duplication is being executed, which is because of the execution of writes in the primary storage area and the secondary storage area in an asynchronous manner. In this case, as another embodiment, a step (not shown) of suspending the write instruction from the host computer 1100 is added immediately after Step 7010. Furthermore, a step (not shown) of canceling the suspension of the write instruction from the host computer 1100 is added immediately before the termination of the duplication restart process. In this manner, this invention can be implemented.

The first embodiment of this invention has been described above. According to the first embodiment, the total write number for the storage area for storing the original data and the total write number for the storage area for storing the backup data are equalized to increase an interval between the replacements of a recording medium used for backup using the data duplication. Accordingly, the maintenance cost for backup operation management can be reduced.

Next, a second embodiment of this invention will be described. In the second embodiment, as in the first embodiment, the number of remaining rewritable times for the physical storage area corresponding to the primary storage area and that for the physical storage area corresponding to the secondary storage area are compared with each other. Then, when the number of remaining rewritable times for the physical storage area corresponding to the primary storage area is smaller than that for the physical storage area corresponding to the secondary storage area, the physical storage areas are swapped. However, the second embodiment differs from the first embodiment in that the duplication management program 1036 stored in the storage system 1000 does not have the function of executing the comparison and the swapping described above. The second embodiment exemplifies that the backup management program 1251 stored in the management computer 1200 provides the function of the comparison and the swapping described above to make this invention applicable.

(3) System Configuration According to the Second Embodiment

Figure 8:
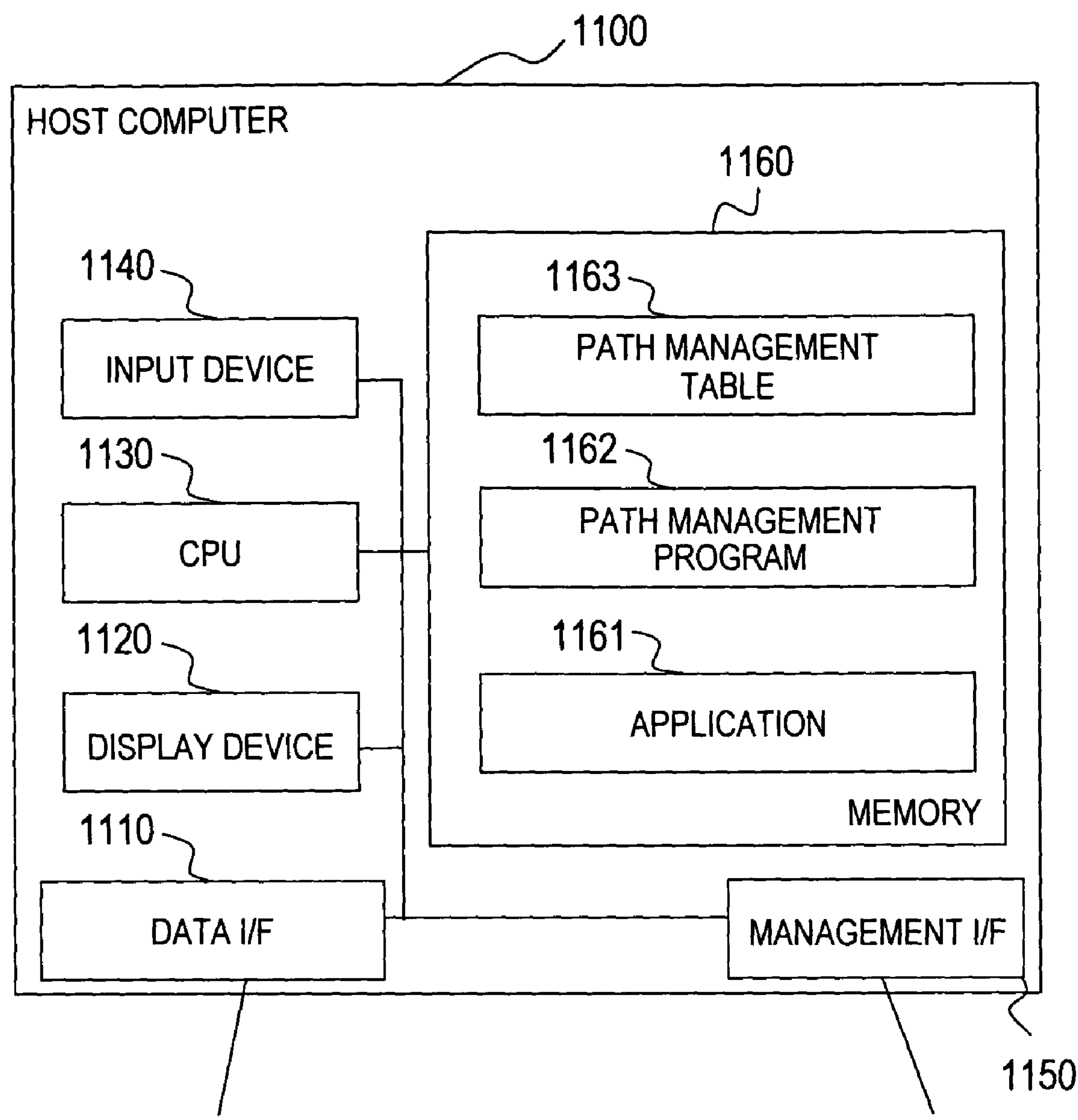
FIG. 8 is a block diagram showing a configuration of a host computer according to a second embodiment of this invention.

FIG. 8 is a block diagram showing a configuration of the host computer 1100 according to the second embodiment of this invention.

The configuration of the computer system according to the second embodiment is the same as that according to the first embodiment except for the host computer 1100. Therefore, hereinafter, only the configuration of the host computer 1100 will be described.

In this embodiment, in the memory 1160 of the host computer 1100, a path management program 1162 and a path management table 1163 are stored in addition to the application 1161.

The path management program 1162 is a program for managing a path to the logical storage area, which is used by the host computer 1100. As in the case of general path management software, the path management program 1162 has a function of switching paths and a function of suspending the I/O instruction from the application 1161. The path management program 1162 provides the CLI or the like as an interface to allow the administrator or the other programs to execute the path management program 1162.

The outline of the path switching function of the path management program 1162 is as follows.

The CPU 1130 which executes the path management program 1162 refers to the path management table 1163 to provide a virtual path for the application 1161. Then, the CPU 1130 transfers an I/O instruction to the virtual path, which is issued by the application 1161, to a real path associated with the virtual path. By changing the association between the virtual path and the real path, the path can be changed without affecting the application 1161.

FIG. 10 is an explanatory diagram of the path management table 1163 according to the second embodiment of this invention.

The path management table 1163 is a table for mapping a real path to the logical storage area and a virtual path used by the application 1161. The CPU 1130, which executes the path management program 1162, sets a value in the path management table 1163. The virtual path used by the application 1161 is designated when the application 1161 issues the I/O instruction.

In a virtual path 10001, virtual path information provided by the path management program 1162 to the application 1161 is set. In a real path 10002, real path information for access to the logical storage area to correspond to the virtual path indicated by the virtual path 10001 is set. In order to set these information, the path management program 1162 provides the CLI. For example, the administrator can issue a command such as "setPath v_path V_P1_T1_L1 -path P1_T1_L1". This command is an instruction to "set a path with a port ID 1, a target ID 1, and a LUN 1 for a virtual path V_P1_T1_L1". The virtual path V_P1_T1_L1 is set in the virtual path 10001 and P1_T1_L1 is set in the real path 10002.

(4) Operation of the Second Embodiment

Hereinafter, a process executed in this embodiment, which is different from those in the first embodiment, will be described. The points omitted in the following description are the same as those in the first embodiment.

First, as shown in FIG. 7, an operation of the CPU 1023 which executes the duplication management program 1036 according to the second embodiment will be described in comparison with the first embodiment.

The duplication management program 1036 according to the first embodiment includes the process of comparing the number of remaining rewritable times for the physical storage area 1011 corresponding to the primary storage area and that for the physical storage area 1011 corresponding to the secondary storage area (Step 7040), and the process of swapping the physical storage areas 1011 when the number of remaining rewritable times for the physical storage area 1011 corresponding to the primary storage area is less than that for the physical storage area 1011 corresponding to the secondary storage area (Step 7060).

However, the duplication management program 1036 according to the second embodiment does not include any of the processes of comparison and of swapping described above. In other words, the CPU 1023 which executes the duplication management program 1036 in this embodiment terminates the process after the execution of the process in Step 7020 described in FIG. 7 without executing Steps 7030 to 7060.

Next, an operation of the CPU 1230, which executes the backup management program 1251, for obtaining new backup data will be described with reference to FIG. 9.

Figure 9:
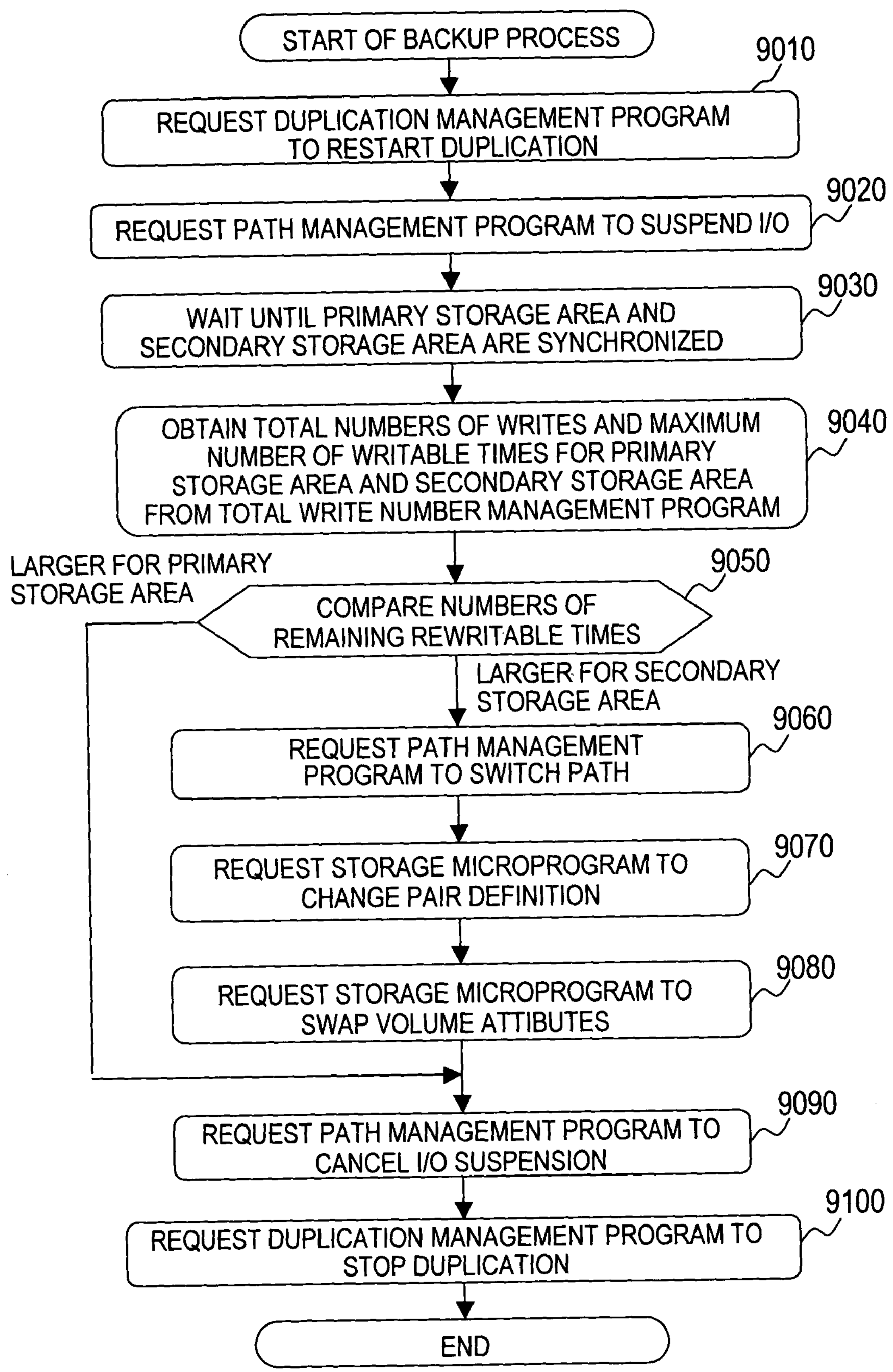
FIG. 9 is a flowchart of a backup process executed by the CPU which executes a backup management program according to the second embodiment of this invention.

FIG. 9 is a flowchart of a backup process executed by the CPU 1230 which executes the backup management program 1251 according to the second embodiment of this invention.

First, the CPU 1230 requests the CPU 1023 executing the duplication management program 1036 to synchronize the pair to restart the duplication of the pair at the time of obtaining new backup data (Step 9010).

Next, the CPU 1230 requests the CPU 1130 executing the path management program 1162 to suspend the I/O instruction from the application 1161 (Step 9020).

Next, the CPU 1230 waits until the data in the primary storage area and the data in the secondary storage area are synchronized with each other (Step 9030). In this step, the CPU 1230 regularly makes a query to the CPU 1023 executing the duplication management program 1036 to verify the synchronization between the data in the primary storage area and that in the secondary storage area. Upon reception of a response indicating that the data have been synchronized from the CPU 1023, the CPU 1230 recognizes that the data stored in the primary storage area and the data stored in the secondary storage area are now identical with each other. Then, the CPU 1230 judges whether or not to swap the primary storage area and the secondary storage area (see Steps 9040 and 9050).

To be specific, after verification of the synchronization, the CPU 1230 obtains the total write number for the physical storage area 1011 corresponding to the primary storage area, the maximum writable number for the physical storage area 1011, the total write number for the physical storage area 1011 corresponding to the secondary storage area, and the maximum writable number for the physical storage area 1011, from the CPU 1023 which executes the total write number management program 1035 (Step 9040). To be specific, the CPU 1023 refers to the total write number management table 1034 to obtain the total write number 5002 and the maximum writable number 5003 and to transmit the obtained total write number 5002 and maximum writable number 5003 to the management computer 1200 via the management I/F 1021 and the management network 1400.

Next, the CPU 1230 calculates the number of remaining rewritable times for each of the physical storage areas 1011 from the obtained maximum writable number and total write number. To be specific, the number of remaining rewritable times is calculated by subtracting the total write number from the maximum writable number. Then, the CPU 1230 compares the number of remaining rewritable times for the physical storage area 1011 corresponding to the primary storage area and that for the physical storage area 1011 corresponding to the secondary storage area with each other (Step 9050).

In Step 9050, when it is judged that the number of remaining rewritable times for the physical storage area 1011 corresponding to the primary storage area is equal to or larger than that for the physical storage area 1011 corresponding to the secondary storage area, the CPU 1230 judges that the primary and secondary physical storage areas 1011 are not required to be swapped. In this case, the CPU 1230 requests the CPU 1130 executing the path management program 1162 to cancel the suspension of the I/O instruction requested in Step 9020 (Step 9090).

Next, the CPU 1230 requests the CPU 1023 executing the duplication management program 1036 to split the pair (in other words, to suspend the duplication) (Step 9100), and then terminates the process.

On the other hand, in Step 9050, when it is judged that the number of remaining rewritable times for the physical storage area 1011 corresponding to the primary storage area is less than that for the physical storage area 1011 corresponding to the secondary storage area, the CPU 1230 judges that the primary and secondary physical storage areas 1011 are required to be swapped. In this case, the CPU 1230 requests the CPU 1130 executing the path management program 1162 to change a destination of connection of the access path from the primary storage area identified by the primary VOLID 3002 to the secondary storage area identified by the secondary VOLID 3004 (Step 9060). The CPU 1130 executing the path management program 1162, which has received the request, rewrites the value of the real path 10002 in the path management table 1163 to change the path.

Next, the CPU 1230 requests the CPU 1023 executing the storage microprogram 1037 to change the pair definition (Step 9070). To be specific, the CPU 1230 makes a request of swapping the value of the primary VOLID 3002 and the value of the secondary VOLID 3004 in the pair definition table 1032.

Next, the CPU 1230 requests the CPU 1023 executing the storage microprogram 1037 to swap the attribute set in the primary VOLID 3002 and the attribute set in the secondary VOLID 3004 (Step 9080).

Herein, the attribute is, for example, the cache residence 2003 shown in FIG. 2. When the frequency of accesses to a part of or all of a certain storage area is high, all the data stored in the corresponding area is copied to a high-speed cache memory (not shown). Accordingly, a large number of accesses are made to the cache memory to increase the process speed.

Since the primary storage area is accessed from the host computer 1100, the access speed is expected to be increased by copying the data in the primary storage area to the cache memory. However, since the secondary storage area is not accessed from the host computer 1100, it is normally not required to copy the data in the secondary storage area to the cache memory. However, as the result of Steps 9060 and 9070, the area, which was previously the secondary storage area, becomes a new primary storage area to be accessed from the host computer 1100. Therefore, by copying the data in the new primary storage area to the cache memory, the access speed is increased. Therefore, when the attribute indicating the copy of data to the cache memory is set for the primary storage area, predetermined performance or function can be maintained by swapping the attributes respectively set for the primary storage area and the secondary storage area simultaneously with the execution of swapping of the primary storage area and the secondary storage area.

The case where the attribute is the cache residence 2003 has been described above as an example. However, any other attributes may be set for each of the storage areas. Even in such cases, by swapping the attributes set for the respective areas, predetermined performance or function can be maintained.

Thereafter, the process after Step 9090 described above is continued.

In normal backup operation, the backup process is executed at predetermined intervals or at backup intervals determined by the administrator. In this embodiment, however, a copy command may be issued when a predetermined period of time has elapsed after the execution of the previous backup process and when the number of writes reaches a predetermined number. As a result, the above-mentioned backup process is executed to swap the primary storage area and the secondary storage area.

A specific example of the write process will now be described with reference to FIGS. 2 to 5 and 10. In the example shown in FIG. 3, in the pair "pair1", the logical storage area "LUN_1" is the primary storage area, whereas the logical storage area "LUN_2" is the secondary storage area. In the example shown in FIG. 2, the logical storage areas "LUN_1" and "LUN_2" correspond to the physical storage areas "PDEV_1" and "PDEV_2", respectively. In the example shown in FIG. 5, the number of remaining rewritable times for the physical storage area "PDEV_1" is 499990000 obtained by subtracting 10000 from 500000000. On the other hand, the number of remaining rewritable times for the physical storage area "PDEV_2" is 499999900 obtained by subtracting 100 from 500000000.

Furthermore, in the example shown in FIG. 10, the virtual path "V_P1_T1_L1" and the real path "P1_T1_L1" are associated with each other. In this example, the real path "P1_T1_L1" is a path from the host computer 1100 to the logical storage area "LUN_1". In this case, when the application 1161 issues a write request to the virtual path "V_P1_T1_L1", the path management program 1162 transfers the write request to the real path "P1_T1_L1". Accordingly, the write to the logical storage area "LUN_1" is executed. The data written in the logical storage area "LUN_1" is actually written in the physical storage area "PDEV_1".

In this case, in Step 9050 shown in FIG. 9, it is judged that the number of remaining rewritable times for the secondary storage area is larger. Then, in Step 9060, a path switching request is issued.

The CPU 1130, which has received the path switching request, executes the path management program 1162 to update the value of the real path 10002 corresponding to the virtual path "V_P1_T1_L1" in the path management table 1163 from "P1_T1_L1" to "P1_T1_L2". As a result, the real path "P1_T1_L2" is now associated with the virtual path "V_P1_T1_L1". The real path "P1_T1_L2" is a path from the host computer 1100 to the logical storage area "LUN_2". After that, when the application 1161 issues a write request to the virtual path "V_P1_T1_L1" (in other words, a write request to the logical storage area "LUN_1"), the path management program 1162 transfers the request to the real path "P1_T1_L2". Accordingly, the write to the logical storage area "LUN_2" is executed. The data written in the logical storage area "LUN_2" is actually written in the physical storage area "PDEV_2" by the storage microprogram 1037.

Next, in Step 9070 of FIG. 9, a pair definition changing request is issued. The CPU 1023, which has received the request, executes the storage microprogram 1037 to swap the "LUN_1" and the "LUN_2 in the pair definition table 1032. Accordingly, the "LUN_2" is set in the primary VOLID 3002 and the "LUN_1" is set in the secondary VOLID 3004 corresponding to the pair name "pair1". As a result, the logical storage area "LUN_2" serves as the primary storage area, whereas the logical storage area "LUN_1" serves as the secondary storage area.

Accordingly, for example, when the application 1161 issues a request of writing the data to the logical storage area "LUN_1", the data is actually written to the physical storage area "PDEV_2". When the duplication is not suspended, the data written in the physical storage area "PDEV_2" is copied to the physical storage area "PDEV_1". In this manner, the primary and secondary physical storage areas 1011 are swapped to equalize the numbers of writes.

The judgment in Step 9050 described above is executed based on the number of remaining rewritable times calculated by subtracting the total write number from the maximum writable number. As in the case of the first embodiment of this invention, however, as shown in FIG. 7, the judgment may be executed based on the total write number, the number of erasures or the performance.

The second embodiment has been described above, taking the case where the primary and secondary storage areas are included in the same storage system 1000 as an example. However, the above-mentioned second embodiment can be implemented even in the case where the computer system includes a plurality of the storage systems 1000 connected to the data network 1300, and the primary storage area and the secondary storage area forming a pair are stored in the different storage systems 1000, respectively.

The above described is the description of the second embodiment of this invention. According to the second embodiment, the management computer 1200 executes the process of comparing the number of remaining rewritable times for the physical storage area 1011 corresponding to the primary storage area and that for the physical storage area 1011 corresponding to the secondary storage area with each other. Furthermore, when the former number of remaining rewritable times is smaller than the latter one as a result of the comparison, the management computer 1200 executes the process of swapping the physical storage areas 1011. Accordingly, even when the storage system is not capable of executing the processes of comparison and swapping described above, this invention is applicable. As a result, the total write number for the storage area for storing the original data and the total write number for the storage area for storing the backup data are equalized to increase the interval between the replacements of a storage medium used for backup using the data duplication. As a result, the maintenance cost for backup operation management can be reduced.

What is claimed is:

1. A storage system coupled to a host computer through a network, comprising:

a plurality of physical storage areas for storing data written by the host computer; and a controller for controlling writing and reading of data to and from the physical storage area, wherein the plurality of physical storage areas include at least a first physical storage area and a second physical storage area, wherein the controller compares a number of remaining rewritable times for the first physical storage area and a number of remaining rewritable times for the second physical storage area and determines whether the data stored in the first physical storage area is the same as the data stored in the second physical storage area; and wherein when it is judged that the number of remaining rewritable times for the first physical storage area is less than the number of remaining rewritable times for the second physical storage area and when it is determined that the data stored in the first physical storage area is the same as the data stored in the second physical storage area, the controller writes the data written by the host computer to the second physical storage area and copies the data written in the second physical storage area to the first physical storage area.

2. The storage system according to claim 1, wherein the controller retains a maximum writable number corresponding to a maximum value of the number of write processes executable for each of the physical storage areas and a total write number corresponding to the number of write processes already executed for each of the physical storage areas, and wherein the controller subtracts the total write number from the maximum writable number to calculate the number of remaining rewritable times.

3. The storage system according to claim 2, wherein the controller accepts an input of the maximum writable number, and wherein the controller retains the input maximum writable number.

4. The storage system according to claim 1, wherein the controller retains a total write number corresponding to the number of write processes already executed for each of the physical storage areas, and wherein the controller judges that the number of remaining rewritable times for the first physical storage area is less than the number of remaining rewritable times for the second physical storage area when the total write number for the first physical storage area is larger than the total write number for the second physical storage area and when it is determined that the data stored in the first physical storage area is the same as the data stored in the second physical storage area.

5. The storage system according to claim 1, wherein the controller swaps an attribute set for the first physical storage area and an attribute set for the second physical storage area when the number of remaining rewritable times for the first physical storage area is less than the number of remaining rewritable times for the second physical storage area and when it is determined that the data stored in the first physical storage area is the same as the data stored in the second physical storage area.

6. The storage system according to claim 1, wherein the host computer issues a write request to a first logical storage area; and in a case where it is judged that the number of remaining rewritable times for the first physical storage area is less than the number of remaining rewritable times for the second physical storage area when the first physical storage area is associated with the first logical storage area and the second physical storage area is associated with a second logical storage area and when it is determined that the data stored in the first physical storage area is the same as the data stored in the second physical storage area, the controller associates the first logical storage area with the second physical storage area and the second logical storage area with the first physical storage area.

7. The storage system according to claim 1, wherein each of the first physical storage area and the second physical storage area is at least one flash memory.

* * * * *